O. T. WAITE.
DECORATIVE MATERIAL.
APPLICATION FILED JULY 16, 1912.

1,084,119.

Patented Jan. 13, 1914.

Witnesses:
Ephraim Banning
Wm. P. Bond

Inventor:
Ossian T. Waite.
By Banning & Banning,
Attorneys.

UNITED STATES PATENT OFFICE.

OSSIAN T. WAITE, OF OSHKOSH, WISCONSIN.

DECORATIVE MATERIAL.

1,084,119.  Specification of Letters Patent.   Patented Jan. 13, 1914.

Application filed July 16, 1912. Serial No. 709,765.

*To all whom it may concern:*

Be it known that I, OSSIAN T. WAITE, a citizen of the United States, residing at Oshkosh, in the county of Winnebago and State of Wisconsin, have invented certain new and useful Improvements in Decorative Material, of which the following is a specification.

The present invention relates to a decorative material in the form of a length or strip, more particularly adapted for such usages as wall decorations, lamp shades, porch curtains, etc.

One of the principal objects of the present invention is to provide a substance of the class described which will obtain its decorative character by means of vegetable matter in its natural state being placed between a backing piece and a covering piece, at least one of which is of a translucent nature, so that the vegetable substance may be observed therethrough.

Another object of the invention is to provide a substance which will have a rough exterior finish similar to burlap, and whose decorative character will be more or less of a wild unconventional nature; and a further object of the invention is to utilize the vegetable substance, which lends the decorative character thereto, as a stiffener or reinforcement for the body of the completed material.

The invention further consists in the features of construction and in the combination of parts hereinafter described and claimed.

Figure 1:
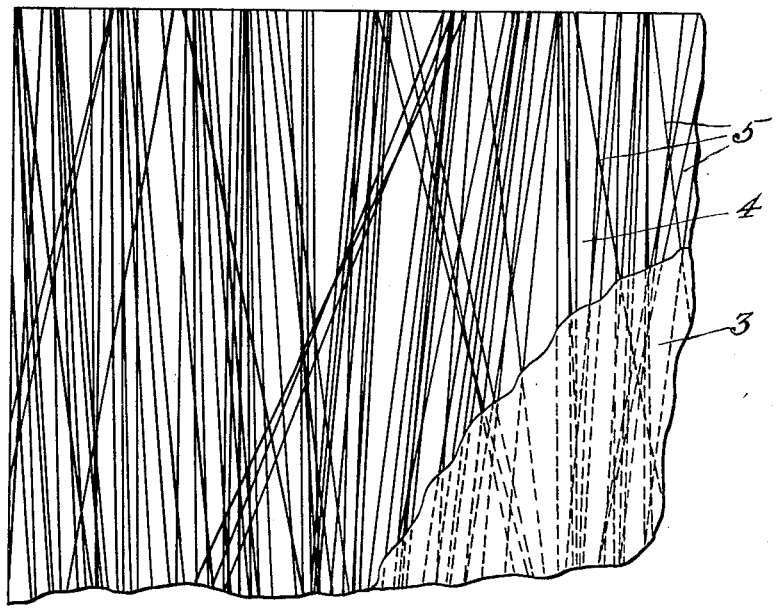
Figure 2:
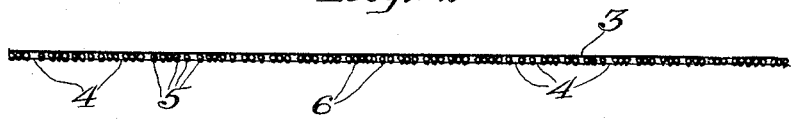

In the drawings, Figure 1 is a face view of a portion of decorative material made according to the teachings of the present invention, the covering being partly broken away; and Fig. 2 is a cross-section of said material.

It is the aim of the present invention to produce a length or strip of decorative material which will receive its decorative character from a mass of vegetable matter in its natural state that is placed in the body of the substance. A type of vegetable matter which is particularly adapted for this usage, and which I consider to be the preferred form of substance for use, is a wire grass utilized in the manufacture of grass twine and rugs and known as *Carex stricta*. This grass is of a peculiar nature, which allows of a considerable bending without breakage occurring, and is of a tough fibrous character possessing great wearing qualities. Obviously, it would be well adapted for use in a decorative substance of the class described, since said substance would then have the yieldability of wall paper, etc., without any danger of its becoming cracked or mutilated when laid upon a surface of undulating nature. Moreover, this substance when embedded in the material, will give it a string or fiber-like appearance, producing a rough surface, such as is found in burlap and like substances used for wall decoration. This substance when used for lamp-shades will give the woven matting effect extremely desirable in such articles. The material is also extremely cheap and by its usage the article can be produced at a very reasonable cost. Although, as stated, this substance is the best which I know of at the present time for carrying out my invention, it is not necessarily limited thereto, since other and just as efficient substances may be found for this purpose.

Referring now to the drawings, the substance consists of what may be termed a back 3, a covering 4, and a filler 5. The covering 4 is preferably under all conditions of a translucent character, such as thin paper or certain kinds of fabric which are of a translucent nature. The covering is preferably of a thin character, so that it may readily mold itself to the outlines of the filler. The back 3 may, under certain conditions, be of an opaque character, and under certain other conditions of a transparent character. For instance, if the substance were used for lamp shades, obviously both the backing and cover must be of a translucent nature. If, however, the substance were used for a wall decoration or a porch curtain, the backing might be of an opaque nature and of a somewhat heavier quality than the covering. The filler which I have illustrated in the drawings is in the nature of a mass of a wire grass known as *Carex stricta*, which is used in the manufacture of such articles as grass rugs. This grass is secured between the backing and cover by any suitable method, and when so secured gives the appearance of a roughly woven or tangled mass. Owing to the thin nature of the covering, this mass will be visible therethrough, and will give to the material its decorative quality, which quality will resemble a paper or cloth of coarse fiber. The covering will configure itself to the grasses and a series of ridges will be produced in the covering, as indicated by the numeral 6 in Fig. 2. These ridges will give to the substance a roughened appearance, so that when placed upon a wall, it will closely simulate the effect produced by burlap or other wall coverings of a similar nature.

It is understood that the vegetable mass is preferably placed in the substance in its natural state, that is, it is not subjected to a shredding or similar operation, and in the case of grasses consists simply of a mass of dried grass. The filler will obviously increase the tensile strength of the completed article, but its main usage is not for this purpose, this being merely incidental. The primary usage is to give to the completed article the rough woven decorative effect heretofore described. The completed article can be sold in rolls or bolts the same as ordinary wall paper, or similar substances, and when the *Carex stricta* grass is employed, no injury or breaking will result from the rolling or bending of the substance. This is an important feature in connection with its usage as a porch curtain, since such articles necessarily are rolled and unrolled a great number of times during usage.

Although various usages for the article have been particularly described, the invention is not necessarily limited thereto, since other usages may be discovered for which it is peculiarly and particularly adapted by its structural property.

It is obvious that in case it is desirable to place the vegetable substance in a symmetrical manner between the back and cover, this can be readily accomplished, although to simulate the rough woven effect highly desirable for the usages enumerated, an indiscriminate arrangement of the grasses would be preferable.

If deemed desirable, a coating of waterproof substance may be placed over either the back or cover, or both. This would of necessity be employed when the material is used as a porch screen.

I claim:

1. As a new article of manufacture, a decorative material comprising a back, a covering of thin translucent material, and fibrous lengths of vegetable material in its natural state interposed between said back and covering and in the manner of a disordered mass, whereby the decorative character of the material is of a rough unsymmetrically woven nature, substantially as described.

2. As a new article of manufacture, a decorative material comprising a back, a covering of thin translucent material, and lengths of *Carex stricta* in its natural state interposed between said back and covering in the manner of a disordered mass, whereby the decorative character of the material is of a rough unsymmetrically woven nature, substantially as described.

OSSIAN T. WAITE.

Witnesses:
 I. J. WELLER,
 D. L. RODERICK.

---

Copies of this patent may be obtained for five cents each, by addressing the "Commissioner of Patents, Washington, D. C."